3,322,792
PRODUCTION OF DICHLOROACETALDEHYDE
CYCLIC TRIMER
David D. Centola, Rockville, Md., assignor to FMC Corporation, New York, N.Y., a corporation of Delaware
No Drawing. Filed July 12, 1963, Ser. No. 294,743
6 Claims. (Cl. 260—340)

The present invention is concerned with an improved process for the production of dichloroacetaldehyde cyclic trimer by the chlorination of acetaldehyde or a cyclic aldehyde polymer.

Dichloroacetaldehyde (DCA) is employed as an intermediate in producing the insecticide, 1,1-di-(4-chlorophenyl)-2,2-dichloroethane (DDD), which is an analogue of DDT. In this process, high-purity dichloroacetaldehyde is desirable in order to obtain a final product having a clear color and a good set point.

One current method for producing dichloroacetaldehyde is carried out by chlorinating either paraldehyde or acetaldehyde in two successive steps, during which hydrogen chloride gas is evolved. In the initial step, at least stoichiometric quantities of chlorine are mixed in the first reactor with either acetaldehyde or paraldehyde at a temperature of about 75–80° C. The partially chlorinated aldehyde is then transferred to a second vessel and there subjected to additional chlorination with excess chlorine. The amount of chlorine which is added is regulated depending upon the rate of the chlorination reaction. This can be measured by analyzing the effluent gases to determine the quantity of hydrogen chloride which is present. The principal reaction which takes place is illustrated below:

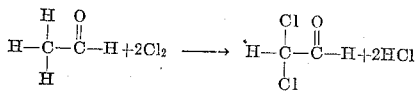

In addition to the principal reaction illustrated above, appreciable side reactions result in the formation of monochloroacetaldehyde (MCA), trichloroacetaldehyde (chloral), and high-boiling linear polymers.

The above reaction is normally carried out in the absence of a catalyst in order to prevent overchlorination of the acetaldehyde to chloral, and to prevent conversion of the DCA product to undesirable linear polymers.

One of the major drawbacks of commercially-produced dichloroacetaldehyde is the large quantity of impurities that are produced along with the principal product. For example, a typical reaction product contains 84.5% dichloroacetaldehyde, 18.2% monochloroacetaldehyde, 2.0% chloral and 0.3% chlorinated impurities. Removal of monochloroacetaldehyde from the DCA product by conventional means is difficult because because these products boil within 3° C. of one another. As a result, separation by normal distillation is normally not feasible.

A second difficulty with plant-produced dichloroacetaldehyde is its tendency to convert to linear polymers upon standing for relatively short times, i.e., within two weeks. It is possible to retard the linear polymerization of dichloroacetaldehyde during delivery by adding various stabilizers. However, these stabilizers are only effective for a limited amount of time and do not prevent linear polymerization.

One method for reducing the concentration of monochloroacetaldehyde (MCA) in commercial dichloroacetaldehyde is taught in my application, Ser. No. 148,855, filed Oct. 31, 1961 in the name of David D. Centola et al., now Patent No. 3,150,189. This application covers the chlorination of paraldehyde or acetaldehyde in the presence of p-toluenesulfonic acid, and other sulfonic acids. While this process has been successful in lowering the monochloroacetaldehyde content, it is not effective in reducing the amount of other impurities in the DCA product mixture. As a result, there is a need for a process which permits production of a DCA product which is free of impurities and which is in a form that is completely resistant to linear polymerization upon extended storage.

It is an object of the present invention to produce an extremely pure DCA product, free of impurities such as MSA and chloral and which is stable under ordinary storage conditions against conversion to linear polymers.

This and other objects will be apparent from the following disclosure.

I have now found that dichloroacetaldehyde can be produced in the form of its solid, cyclic trimer, substantially free of impurities, by heating dichloroacetaldehyde monomer having a monochloroacetaldehyde content less than about 1% by weight to temperatures of from about 10° C. to about 70° C. (and preferably from about 50–55° C.) in the presence of both a Lewis acid and chlorine. The dichloroacetaldehyde trimer can be depolymerized readily at its point of use to the monomeric form by simple acid treatment.

The dichloroacetaldehyde cyclic trimer can be produced according to the present invention by two separate methods. In the first method, a typical plant-produced dichloroacetaldehyde reaction product containing 85% dichloroacetaldehyde, 18.2% monochloroacetaldehyde and minor amounts of other impurities is treated to reduce the monochloroacetaldehyde content of the mixture below about 1% by any known means. Among the methods which are known to reduce the MCA content is the process taught in my application Ser. No. 148,855, filed Oct. 31, 1961, in the name of David D. Centola et al. In this method, chlorination of the aldehyde feed is carried out in the presence of selected sulfonic acids, such as p-toluene sulfonic acid. Another method is taught in application Ser. No. 263,410, filed Mar. 7, 1963 in the name of Sidney Berkowitz et al., now Patent No. 3,253,041. In this process, chlorination of the aldehyde feed is carried out in the presence of phosphoric acid.

The result purified reaction mixture containing dichloroacetaldehyde monomer in major amounts but with a monochloroacetaldehyde content less than about 1% by weight, is heated to temperatures of from about 10° C. to 70° C. in the presence of both chlorine and from 0.1% to about 1% by weight of a Lewis acid. The dichloroacetaldehyde trimer forms a solid precipitate upon cooling of the liquid reaction mixture and can be separated by filtration from the mother liquor in substantially a pure state and in a form which is completely stable against linear polymerization under normal storage conditions.

The alternate method for producing dichloroacetaldehyde trimer is carried out by chlorinating acetaldehyde or paraldehyde in two stages to produce a dichloroacetaldehyde product containing less than 1% monochloroacetaldehyde. This is achieved by employing a Lewis acid catalyst in the final stage used in producing the dichloroacetaldehyde monomer. This last stage is also conducted under the conditions necessary to produce the dichloroacetaldehyde trimer so that conversion of the dichloroacetaldehyde monomer to the timer takes place in situ in the last reaction stage of the process.

In the above process, the starting material can be either acetaldehyde or paraldehyde and it is chlorinated to produce the liquid dichloroacetaldehyde in a two-step procedure which permits better chlorination and control of reactions than a single stage operation. In the two-step process, a feed reactant such as paraldehyde is added to a first reactor, chlorine gas is bubbled through the liquid in at least stoichiometric amounts, and hydrogen chloride and unreacted chlorine gas are removed overhead. Since the chlorinated stage is an exothermic reaction, cooling means are normally employed for maintaining the temperature at 75–80° C. The partially-chlorinated mixture from the first reactor is then passed into a second reactor in which is present from about 0.1% to about 1% of a Lewis acid such as antimony trichloride. Excess chlorine is bubbled through the solution in the second stage until maximum conversion to dichloroacetaldehyde is completed and the dichloroacetaldehyde is trimerized in situ. The preferred amount of a Lewis acid is normally from about 0.5% to 0.9% by weight. The trimer is recovered upon cooling of the reaction mixture as a solid precipitate in a pure state, and free of the impurities which remain behind in the mother liquor.

The reaction mixture in the second reactor is kept at temperatures of from about 10–70° C. to produce the DCA trimer. Best yields are normally obtained at temperatures from about 50–55° C. If the reaction is permitted to run at temperatures above about 70° C., the Lewis acids catalyze the undesired conversion of dichloroacetaldehyde monomer to chloral, particularly when the catalyst is employed in excess of about 0.5% by weight. Accordingly, while higher temperatures accelerate conversion to the cyclic trimer, these higher temperatures are not preferred because some of the dichloroacetaldehyde is also converted to chloral at these temperatures in the presence of Lewis acids.

When the chlorination has proceeded to a point where the MCA content of the reaction mixture is less than 1%, conversion of the DCA monomer to the cyclic trimer takes place quickly. The trimer can be evidenced by cloudiness or the appearance of crystals in the solution, depending upon the temperature at which the chlorination is being run. When this solution is cooled, the solid dichloroacetaldehyde trimer can be removed from the remaining mother liquor by simple filtration or by centrifuging. The resultant mother liquor normally contains substantial proportions of dichloroacetaldehyde monomer and is recycled in part to the reactor to avoid loss of dichloroacetaldehyde monomer.

The amount of chlorine which must be present in the reaction solution containing the DCA monomer is not critcial. Generally, the addition of a small stream of chlorine to the reaction solution during the formation of the dichloroacetaldehyde trimer is sufficient. While the exact amount of chlorine is not critical, the presence of chlorine is necessary in catalytic amounts in order to bring about formation of the dichloroacetaldehyde trimer.

The other catalyst which must be present simultaneously with chlorine to bring about dichloroacetaldehyde trimer formation is a Lewis acids. Among the Lewis acids which have been found satisfactory are the antimony chlorides, e.g., $SbCl_3$, $SbCl_4$, aluminum chloride, the tin chlorides, e.g. $SnCl_2$, $SnCl_4$, boron trifluoride, boron trichloride and the iron halides, e.g. $FeCl_3$. The Lewis acids have been found effective within the range of about 0.1 to about 1% by weight with a preferred range of about 0.5–0.9%. The exact amount of Lewis acid necessary to obtain optimum yields depends upon the particular acid which is utilized in making the dichloroacetaldehyde trimer. In any event, when chlorine and the Lewis acid are present simultaneously in the reaction mixture, formation of the dichloroacetaldehyde trimer rapidly occurs.

The following examples are given to illustrate the invention but are not deemed limitative thereof.

*Example 1*

Two hundred and twenty-six grams of a pure DCA product containing 92% DCA, 4% chloral and 1% MCA was heated to 50° C.; a small stream of chlorine was continually passed through the DCA product. After the chlorine had saturated the DCA product mixture, 2.03 g. (0.9%) of $SbCl_3$ catalyst was added along with 0.12 g./min. of chlorine. At the end of 15 min., crystals and cloudiness appeared in the reaction mixture and chlorine uptake ceased. The chlorine flow was discontinued and the reaction mixture was heated to 85° C. The resulting clear solution was cooled to 30° C. and the solids which crystallized out of solution were filtered, washed and dried. They had a melting point of 131–132° C. and were identified as dichloroacetaldehyde trimer. The yield of DCA trimer based on the DCA in the original feed mixture was 62%. DCA monomer was present in the mother liquor. Additional trimerization, cooling, and precipitation increased the yield to 80%. Preferably, the mother liquor is fed into a new batch in the second reactor.

*Example 2*

One and eight-tenths grams (0.88%) of antimony trichloride was added to 206.4 g. of a DCA crude product assaying 80% DCA, 3% chloral and 17% MCA. The solution was heated to 55–58° C. and chlorine bubbled into the solution at a rate of 20.5 g./hr. for 4 hrs. After 2 hrs., the MCA content was reduced below 1% and crystals began to appear in the reaction mixture. At the end of 4 hrs., the reaction mixture was cooled overnight to 30° C. and the solid crystalline mass filtered. The product was washed and dried and had a melting point of 131–132.5° C. The yield based on the DCA in the feed stream was 63.2%. A substantial proportion of the remaining DCA monomer present in the feed stream remained in the mother liquor.

*Example 3*

The process of Example 1 was repeated using 0.2% by weight ferric chloride as the catalyst. A product identified as dichloroacetaldehyde trimer was recovered from the liquid reaction mixture having a melting point of 131–132° C.; the product yield was 36% of the DCA present in the feed stream. The mother liquor was found to contain substantial portions of DCA monomer.

*Example 4*

The process of Example 1 was repeated using 0.9% by weight aluminum chloride as the catalyst. A product identified as dichloroacetaldehyde trimer was recovered from the liquid reaction mixture having a melting point of 131–132° C.; the product yield was 39% of the DCA present in the feed stream. The mother liquor was found to contain substantial portions of DCA monomer.

*Example 5*

The process of Example 1 was repeated using 0.5% by weight stannic chloride as the catalyst. A product identified as dichloroacetaldehyde trimer was recovered from the liquid reaction mixture having a melting point of 131–132° C.; the product yield was 55% of the DCA present in the feed stream. The mother liquor was found to contain substantial portions of DCA monomer.

*Example 6*

The process of Example 1 was repeated using 0.5% by weight boron trifluoride as the catalyst. A product identified as dichloroacetaldehyde trimer was recovered from the liquid reaction mixture having a melting point of 131–132° C.; the product yield was 53% of the DCA present in the feed stream. The mother liquor was found to contain substantial portions of DCA monomer.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Process of producing dichloroacetaldehyde in the form of a solid cyclic trimer which comprises heating a liquid dichloroacetaldehyde monomer to temperatures of from about 10° C. to about 70° C. in the presence of both a Lewis acid and chlorine, said dichloroacetaldehyde reagent containing monochloroacetaldehyde as an impurity in amounts less than about 1% by weight, and recovering a solid dichloroacetaldehyde trimer substantially free of impurities.

2. Process of claim 1 in which the dichloroacetaldehyde reagent is heated to temperatures of from about 50–55° C.

3. Process of claim 1 in which said Lewis acid is antimony trichloride.

4. Process of claim 1 in which said Lewis acid is present in amounts of from about 0.1% to about 1% by weight.

5. Process of producing dichloroacetaldehyde in the form of a solid, cyclic trimer which comprises reacting chlorine in at least stoichiometric amounts with an aldehyde selected from the group consisting of acetaldehyde and paraldehyde at temperatures of from about 50° C. to 85° C. to partially chlorinate said aldehyde, reacting said partially chlorinated aldehyde in a second reactor with additional chlorine in the presence of about 0.1% to about 1% of a Lewis acid at temperatures of from about 10° C. to about 70° C. to maintain the monochloroacetaldehyde content of said final reaction mixture below about 1%, and separating a solid dichloroacetaldehyde trimer product from said liquid reaction mixture substantially free of impurities.

6. Process of claim 5 in which the acetaldehyde is paraldehyde and the Lewis acid is antimony trichlorde.

References Cited

UNITED STATES PATENTS

| 2,768,173 | 10/1956 | Wohlers et al. | 260—340 |
| 3,031,461 | 4/1962 | Powell et al. | 260—340 |
| 3,150,189 | 9/1964 | Centola | 260—601 |

FOREIGN PATENTS 198,576   6/1923   Great Britain.

OTHER REFERENCES

Fieser et al.: Organic Chemistry, 3rd Ed. (1956), pp. 199–200.

WALTER A. MODANCE, *Primary Examiner.*

NORMA S. MILESTONE, *Assistant Examiner.*

UNITED STATES PATENT OFFICE
CERTIFICATE OF CORRECTION

Patent No. 3,322,792                                             May 30, 1967

David D. Centola

It is hereby certified that error appears in the above numbered patent requiring correction and that the said Letters Patent should read as corrected below.

Column 1, line 54, strike out "because", second occurrence; column 2, line 9, for "MSA" read -- MCA --; line 41, for "result" read -- resultant --; line 62, for "timer" read -- trimer --; column 3, line 43, for "critcial" read -- critical --; column 6, line 8, for "trichlorde" read -- trichloride --.

Signed and sealed this 9th day of January 1968.

(SEAL)
Attest:

Edward M. Fletcher, Jr.                                   EDWARD J. BRENNER

Attesting Officer                                                 Commissioner of Patents